Aug. 26, 1958     J. T. ROOS     2,849,122
PAN FILTER CONSTRUCTION
Filed Feb. 5, 1957
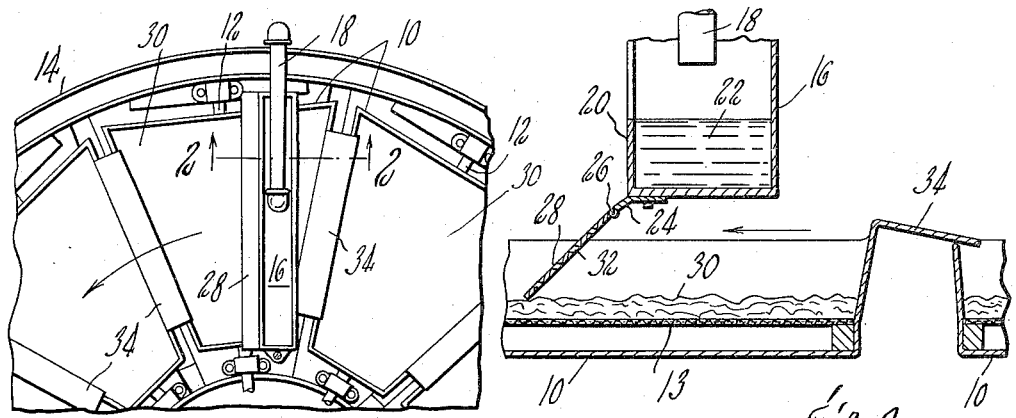
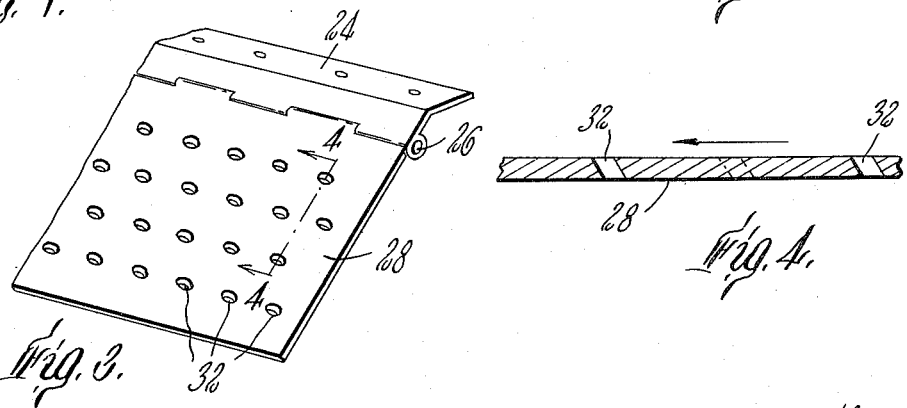
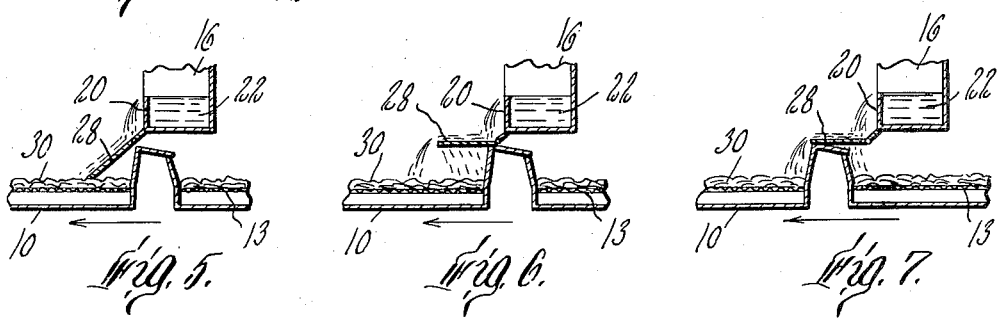
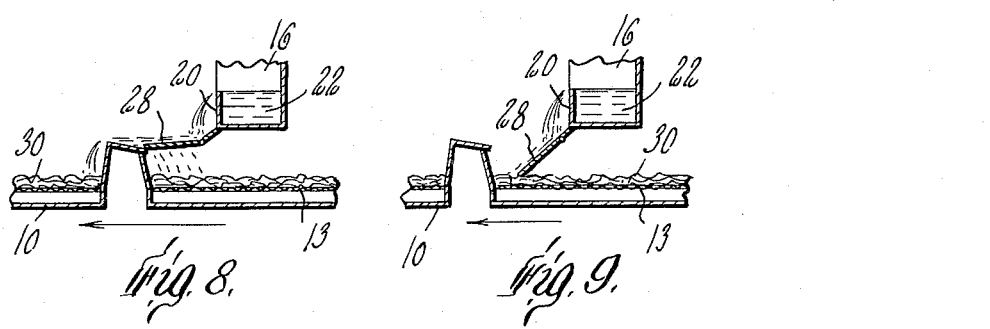

United States Patent Office 2,849,122
Patented Aug. 26, 1958

2,849,122

PAN FILTER CONSTRUCTION

John T. Roos, Walpole, Mass., assignor to Bird Machine Company, South Walpole, Mass., a corporation of Massachusetts Application February 5, 1957, Serial No. 638,246

5 Claims. (Cl. 210—328)

This invention relates to a pan filter of the tilting cell type and pertains more specifically to an improvement in the means for supplying liquids to the cells, either liquids containing solid material to be filtered (e. g., a slurry) or wash water or liquor for washing filter cakes already formed in the filter cells.

In conventional horizontal pan type filters composed of either a circular or linear array of individual cells each of which is loaded with slurry, washed, and dumped by tilting during the course of a single cycle, there is a problem in supplying the liquid slurry or wash water to the cells as they are advancing in their path. The liquid must be supplied rapidly to each cell, but it is undesirable to permit a stream of the liquid to impinge directly against the filter with great force because this tends to break up and disrupt the filter cake.

One object of the present invention is to provide an improved liquid supply means for horizontal pan filters of the type described.

Another object is to provide an improved liquid supply means for distributing liquid substantially uniformly across the face of each cell in a horizontal pan type filter regardless of rate of flow.

Other and further objects will be apparent from the drawings and from the description which follows.

In the drawings:

Fig. 1 is a plan view of a portion of a conventional rotary horizontal filter showing one embodiment of the present invention applied to the supply of wash liquor to the filter cells;

Fig. 2 is a view in vertical section along line 2—2 of Fig. 1;

Fig. 3 is an isometric view of the guide plate on an enlarged scale;

Fig. 4 is a view in cross section taken along line 4—4 of Fig. 3; and

Figs. 5 to 9 inclusive are views corresponding to Fig. 2 showing successive stages in the operation of the embodiment of Figs. 1 and 2.

While the invention is described, for the purpose of illustration, as applied to a rotary horizontal pan filter, it will be understood that it may equally well be applied to any other pan type filter such as the belt filter described in Giorgini U. S. Patent 2,677,467, granted May 4, 1954.

Referring to the drawings, the filter shown includes a plurality of individual filter cells 10, 10 mounted in a circular array. Each cell is mounted on a shaft 12 the outer end of which rides on a circular track 14, all of the cells together rotating about a generally vertical axis. In the embodiment shown in Fig. 1 the rotation is in the direction indicated by the arrow. Each cell 10 is arranged for pivoting or tilting in any conventional manner about its respective shaft 12 at a station along the path of movement of the cells. Any conventional means for supplying liquid slurry or wash water to the upper face of each filter cell and for removing the water or other liquid component of the slurry through the filter cloth 13 of each cell may be provided.

The means for supplying wash water or liquor to the cells after accumulation of a filter cake on their surfaces, in the embodiment shown in Figs. 1 and 2, comprises a trough 16 having an inlet pipe 18 which is connected to a supply of wash water or liquor (not shown) and which is supported from overhead structure (not shown) in any conventional manner. One side wall of trough 16 is cut away, as shown in Fig. 2, to provide a weir 20 having either a straight or a V-notched edge over which the supply of liquid 22 overflows. Secured to the bottom margin of trough 16 beneath weir 20 is a bracket 24 to which is joined by a hinge connection 26 a perforate guide or deflector plate 28. Guide plate 28 may be made of any suitable material such as metal or wood and includes as an essential feature a plurality of openings 32. The lower free end of guide plate 28, as appears in Fig. 2, rests upon the surface of the filter cake 30 which has accumulated in each cell on the upper face of filter cloth 13, guide plate 28 being inclined to the horizontal when in this position and being of such length that it intercepts the trajectory of the liquid flowing over weir 20.

The trailing margin of each cell 10 is provided with an imperforate distributor plate 34 which extends across the gap between adjacent cells and over the leading margin of the next successive cell, as shown in Fig. 2. Guide plate 28 when in lowered position is engaged by the trailing margin of each cell 10 as the cells advance and is raised to slide over the margin and over distributor plate 34, in which position it is relatively slightly inclined to the horizontal.

Although the precise size and spacing of the openings 32 in the perforate guide plate are not critical, it is preferred, for best results, that the axis of each opening be inclined toward the free end of the upper face of plate 28 as seen in Fig. 4 and that the pattern of the holes be staggered. There should be sufficient openings to permit the passage of substantial quantities of liquid therethrough when the plate is in raised position, but the openings should be small enough so that they break up and subdivide a stream of liquid impinging upon the face of the plate.

In operation of the device, as shown in Figs. 5 to 9 inclusive, the flowing liquid is intercepted by guide plate 28 and flows primarily along the upper face of the guide plate in the direction shown by the arrow in Fig. 4 when the plate is in its inclined position with its lower edge resting on the filter cake.

The inclination of the axis of the perforations, as shown in Fig. 4, toward the lower edge of the upper face of guide plate 28 together with capillary attraction tends to hinder the liquid from flowing through the perforations when the plate is in its inclined position, as shown in Figs. 5 and 9, whatever small quantity does pass through the perforations clinging for the most part to the lower face of the guide plate by capillary attraction until it reaches the filter cake. Consequently, the liquid flows gently onto the surface of the cell, thus avoiding disruption of the cake.

As the cells continue to rotate beneath trough 16, the margin of distributor plate 34 impinges against guide plate 28, raising it to a more nearly horizontal position as shown in Fig. 6. In this position most of the liquid overflowing weir 20, instead of flowing along the upper face of guide plate 28, passes through the perforations 32, thus distributing the wash liquor close to the trailing margin of cell 10 in the zone which was not washed while the guide plate was in the position shown in Fig. 5.

In addition, interposition of the perforate guide plate between the weir and the cell prevents direct impact of the entire stream of liquid with full force against the cell and serves to spread the flow of liquid from a V-notched weir more uniformly, particularly when openings or perforations 32 are arranged in a pattern of staggerd rows. This interception, deflection and subdivision of the liquid stream by the guide plate minimizes disruption and disturbance of the filter cake. As shown in Fig. 7, the liquor passing through perforations 32 as the cells continue their advance drops upon the filter cake closely adjacent the leading margin of the next succeeding cell. Subsequently, as shown in Figs. 8 and 9, when the guide plate 28 again drops to its inclined position most of the liquid again flows along the upper face of the guide plate with only a very small quantity passing through perforations 32.

If desired, the guide plate 28 may be made of some flexible material such as rubber, thus eliminating the necessity for hinge 26, the plate as a whole simply flexing upwardly as it passes over the margins of adjacent cells. The length and flexibility (or stiffness) of the plate 28 is chosen so that it intercepts in both its raised and lowered positions the trajectory of the flowing liquid.

The size, number, and distribution of the perforations or apertures in the guide plate is dependent upon the rate of flow of the liquid to be distributed and is simply a matter of choice for those skilled in the art.

Although specific embodiments of the invention have been described herein, it is not intended to limit the invention solely thereto, but to include all of the obvious variations and modifications within the spirit and scope of the appended claims.

I claim:

1. In a pan type filtering device comprising an array of individual filter cells arranged for advancing in sequence and a supply means above the path of the advancing cells for feeding liquid onto said cells successively as they advance, the improvement comprising a perforate deflector member mounted between said supply means and said cells for deflecting and guiding said liquid onto the face of said cells, said deflector member having a free end swingable to and from a lowered position in which the liquid flows primarily across the face of said deflector to the cells and a raised position in which the liquid flows primarily through said perforations onto said cells, said deflector being swingable to and from said positions by the advancing movement of the cells therebeneath.

2. The device of claim 1 comprising in addition an imperforate distributor plate secured to a margin of each said cell and extending across the gap between adjacent cells and over the margin of the next adjacent cell.

3. In a filtering device comprising a circular array of individual filter cells arranged for rotation about a generally vertical common axis and supply means above said cells for feeding wash water onto said cells successively as they rotate, the improvement comprising a perforate deflector plate having one end mounted in fixed position above said cells with its other end free to rest in a first position upon each cell passing therebeneath, the trailing margin of each advancing cell striking said deflector plate to swing it upwardly to a second position to permit each margin to pass therebeneath, said deflector plate in both positions being arranged to intercept and deflect a stream of wash water falling from said supply means onto said cells and in said first position being inclined to the horizontal to permit said wash water to flow along said deflector plate to the cell and in said second position being more nearly horizontal to permit said wash water to flow through said perforations onto said cells.

4. The device of claim 3 in which an imperforate distributor plate is secured to the trailing margin of each said cell and extends across the gap between adjacent cells and over the leading margin of the following cell.

5. The device of claim 3 in which the axes of the perforations in said deflector member are inclined toward the free end of the upper face of said member.

References Cited in the file of this patent

UNITED STATES PATENTS

| | | |
|---|---|---|
| 874,437 | Puckett | Dec. 24, 1907 |
| 938,378 | Grothe et al. | Oct. 26, 1909 |
| 978,381 | Kier | Dec. 13, 1910 |
| 1,284,347 | Howson | Nov. 12, 1918 |
| 2,776,755 | Craig | Jan. 8, 1957 |